United States Patent
Bonelli et al.

(10) Patent No.: US 8,573,470 B2
(45) Date of Patent: Nov. 5, 2013

(54) WELDING SYSTEM

(75) Inventors: Renato Bonelli, Matelica (IT); Teresio Signaroldi, Sordio (IT); Andrea Provesi, Secugnago (IT)

(73) Assignee: Saipem S.p.A., San Donato Milanese, Milan (IT)

( * ) Notice: Subject to any disclaimer, the term of this patent is extended or adjusted under 35 U.S.C. 154(b) by 217 days.

(21) Appl. No.: 12/444,627

(22) PCT Filed: Oct. 4, 2007

(86) PCT No.: PCT/EP2007/008600
§ 371 (c)(1),
(2), (4) Date: Apr. 28, 2009

(87) PCT Pub. No.: WO2008/052632
PCT Pub. Date: May 8, 2008

(65) Prior Publication Data
US 2010/0006627 A1 Jan. 14, 2010

(30) Foreign Application Priority Data
Nov. 1, 2006 (GB) .................................. 0621780.6

(51) Int. Cl.
*B23K 9/12* (2006.01)
(52) U.S. Cl.
USPC ... 228/212; 228/29; 219/124.31; 219/125.11; 219/125.12
(58) Field of Classification Search
USPC .................. 228/212, 29; 219/124.31, 125.11, 219/125.12
See application file for complete search history.

(56) References Cited

U.S. PATENT DOCUMENTS

| 3,727,025 A | 4/1973 | Dibenedetto |
| 3,737,614 A | 6/1973 | Paulange |
| 5,534,676 A * | 7/1996 | Rinaldi et al. ........... 219/124.34 |
| 5,676,857 A | 10/1997 | Parker |
| 5,981,906 A * | 11/1999 | Parker ..................... 219/137 PS |
| 6,622,906 B1 * | 9/2003 | Kushibe ....................... 228/212 |
| 6,953,909 B2 * | 10/2005 | Marhofer et al. ........ 219/125.12 |

FOREIGN PATENT DOCUMENTS

| DE | 22 38 147 A1 | 2/1974 |
| FR | 2744943 A1 | 8/1997 |
| GB | 1 359 098 A | 7/1974 |
| GB | 1 443 556 A | 7/1976 |
| GB | 2159748 A | 12/1985 |
| JP | 07088646 A * | 4/1995 |
| SU | 593865 | 2/1978 |
| WO | WO 00/38872 A1 | 7/2000 |
| WO | WO 02/30608 A1 | 4/2002 |

OTHER PUBLICATIONS

PCT/ISA/210 for PCT/EP2007/008600 completed Jan. 16, 2008.
PCT/ISA/237 for PCT/EP2007/008600 completed Jan. 16, 2008.
United Kingdom Search report for GB0621780.6 dated Feb. 20, 2007.

* cited by examiner

*Primary Examiner* — Nicholas P D'Aniello
(74) *Attorney, Agent, or Firm* — Buchanan Ingersoll & Rooney PC

(57) ABSTRACT

A welding bug (1) comprising a welding torch (3) for welding in a groove (19). The welding torch (3) is mounted for rotational movement about an axis (21) that is substantially horizontal, relative to the welding bug, (typically tangential to a pipe during use) so that the torch is moveable, during use of the welding bug (1) when arranged to enable the torch to weld in a groove, between (i) an operating position, and (ii) a disengaged position in which the welding torch is positioned away from the groove (19). The welding bug may be less cumbersome and more compact than some known arrangements.

11 Claims, 6 Drawing Sheets

WELDING SYSTEM

TECHNICAL FIELD

The present invention relates to an apparatus and method for welding pipes together. More specifically the invention relates to a welding bug for welding together pipe sections when laying pipelines. The pipelines may be underwater pipelines or inland pipelines.

BACKGROUND OF THE INVENTION

It is known to use welding bugs in automated pipe welding arrangements. In such arrangements, at least two welding bugs are typically mounted, on a pipe clamp, for circumferential movement around the pipe so that torches on the bugs may weld within a groove defined between the pipes. It may be necessary, in some circumstances, to disengage at least part of that bug (by moving it). For example, the torch may be disengaged so as not to obstruct another welding bug performing its weld pass.

Typically the movement to a disengaged position includes lifting the torch out from the groove and then rotating the welding torch on the bug to one side, by rotating the torch about an axis that extends vertically relative to the welding bug (i.e. parallel to its height and typically radially when the bug is mounted on a pipe). However, moving the welding torches to such a position tends to make the welding bug cumbersome on the pipe. The welding bug may take up a relatively large amount of space on the pipe circumference and be difficult to manoeuvre. In addition, this arrangement on a welding bug may be heavy and/or difficult to maintain.

A possible solution to the problem is to move to the disengaged position by lifting the torch from the groove and then moving the main body of the bug backwards. However, this may be undesirable since the cutback of the pipe coating (for example a concrete coating) may need to be extended. This may be expensive, and in some cases, not be feasible.

SUMMARY OF THE INVENTION

The present invention seeks to mitigate or remove at least some of the above-mentioned problems.

The present invention provides a welding bug comprising a welding torch for welding in a groove, wherein the welding torch is mounted for rotational movement about an axis that is substantially horizontal relative to the welding bug so that the torch is moveable, during use of the welding bug when arranged to enable the torch to weld in a groove, between (i) an operating position in which the welding torch is positioned in the groove, and (ii) a disengaged position in which the welding torch is positioned away from the groove.

By mounting the welding torch for rotational movement about a horizontal axis between the operating position and the disengaged position, the present invention may remove, or at least reduce, some of the disadvantages with the aforementioned arrangements. In particular, the welding bug tends to be relatively compact on the pipe circumference when the torch is in the disengaged position. The welding bug may be relatively easy to manoeuvre around the pipe in the disengaged position.

Preferably the welding torch, in the disengaged position, is sufficiently far away from the groove to substantially prevent interference with the pipe. The welding torch, in the disengaged position may allow passage of a second welding torch (for example a welding torch on an additional welding bug) along the groove, in vicinity of the welding bug.

The welding torch of an embodiment of the present invention, during movement between the operating position and the disengaged position, may also have a trajectory that interferes with fewer elements on the welding bug and/or pipe (such as guides, umbilicals and hoses), than the trajectory of the welding torch on some known welding bugs, in which the trajectory results at least partially from rotation about a vertical axis.

In many welding bug arrangements, it tends to be necessary, upon completion of a weld pass, to move the welding torch in a radial direction (with respect to the pipe being welded) so that the torch does not interfere with the side of the groove. In some known welding bugs this radial movement is separate and distinct from any other movement away from the groove. The arrangement of embodiments of the present invention may enable the movement of the torch (between the operating and the disengaged positions) to comprise both a component along the length of the pipe and a radial component. This movement may be a one-stage movement. The present invention may therefore enable improved control of the welding torch in the radial direction. Alternatively or additionally the present invention may enable a simpler arrangement for movement of the welding torch between the operating and the disengaged position.

The welding torch may also be mounted for linear movement in a direction along the length of the bug. The movement of the welding torch between the operating position and the disengaged position may comprise a linear component (the linear component typically being in addition to a rotational component). For example, the horizontal axis may be mounted for linear movement on a slideway. The linear component of movement may comprise a component in a horizontal direction (relative to the welding bug). The linear movement is preferably relative to the main body of the welding bug. The main body of the welding bug may be arranged such that in use its separation from the weld in a direction parallel to the axis of the pipe is substantially constant. Thus, the main body may not, in use, move backwards relative to the weld. An arrangement which facilitates a combination of rotation about a horizontal axis and linear movement, relative to the main body of the welding bug, has been found to be particularly beneficial.

The welding torch may be mounted in a direction along the length of the bug, whilst the welding torch is in the operating position. For example, the linear movement may be used to oscillate the welding torch in the groove during use. Alternatively or additionally, the linear movement may be used to guide the welding torch with regard to the centre-line of the groove, for example the linear movement may be used to compensate for lack of parallelism between a welding clamp and the groove. In such embodiments, the welding torch may be mounted for linear movement relative to the control arm. For example, the welding torch may be mounted for linear movement relative to the end of the control arm to which it is connected, when the welding torch is in the operating position.

Certain directions are defined herein with respect to the welding bug. These directions will be readily apparent to the person skilled in the art. The horizontal axis is preferably parallel to the width of the bug. Thus, the horizontal axis is typically (during use of the welding bug when arranged to enable the torch to weld in the groove) substantially parallel to the tangent to the pipe cross-section, at the location being welded. It will be appreciated that in the coordinate system of the body being welded, the orientation of the horizontal axis may change. The length of the bug is preferably (during use of the welding bug when arranged to enable the torch to weld in the groove) in a direction perpendicular to the groove. The length of the bug may be substantially parallel to the longitudinal axes of the pipes to be welded. The vertical axis is preferably parallel to the height of the bug. Thus, the vertical axis is typically (during use of the welding bug when arranged to enable the torch to weld in the groove) substantially parallel to the radius of the pipe at the location being welded.

The welding torch may be mounted for rotational movement about a plurality of axes that are substantially horizontal, relative to the welding bug, between the operating position and the disengaged position.

The welding torch may be mounted for counter-rotational movement about at least two of those axes. For example, during use the torch may rotate about one horizontal axis and counter rotate about another horizontal axis. During movement of the welding torch between the operating and disengaged position, the welding torch may be rotated by substantially equal and opposite amounts about the two axes, thereby maintaining substantially the same orientation in the operating and disengaged positions.

The welding bug may comprise a control arm connected to the torch, wherein movement of the control arm effects movement of the torch between the operating position and the disengaged position. The control arm is preferably mounted on the welding bug for rotational movement about the horizontal axis. The control arm may be segmented. The control arm may comprise a plurality of joints. The control arm may comprise an elbow joint. The control arm may comprise a ball-and-socket joint. The control arm may be mounted on the welding bug for linear movement in a direction along the length of the bug. The control arm may be robotic.

The location of the horizontal axis may be moveable with respect to the bug main body, or fixed with respect to the welding bug main body. For example, in the case where a control arm is provided, the arm may be mounted for rotational movement about a fixed horizontal axis on the welding bug. Alternatively, the horizontal axis may be mounted for linear movement along the length of the welding bug.

The welding bug may further comprise a control unit. The control unit may be arranged to facilitate guidance of the welding torch between the operating position and the disengaged position. Alternatively or additionally, the control unit may be arranged to facilitate guidance of the welding torch along the groove, preferably along the centre of the groove. For example, the control unit may be arranged to facilitate seam tracking of the welding torch. The control unit may be arranged to facilitate guidance of the welding torch via the control arm. The control unit may be arranged to receive, during use, a signal relating to the position of the welding torch within the groove and to facilitate movement of the welding torch in dependence on this signal.

The welding bug is preferably mountable for movement on a pipe clamp, for example a circumferential pipe clamp.

The welding bug may be arranged to be operable to weld in either direction along the groove. The welding bug may be substantially symmetrical about a vertical plane running along the length of the welding bug. For example, a wire feed arrangement on the bug is preferably equally visible from either side of the welding bug.

As the present invention may not necessarily require the welding torch to be rotatable about a vertical axis, the welding bug may be more compact, especially along its width (along the groove). The welding bug according to embodiments of the invention may also be more simple, light and/or easy to maintain that known welding bugs.

Embodiments of the present invention, which may be of particular benefit relate to a welding bug comprising a plurality of welding torches. The welding bug may comprise a plurality, or even a multiplicity of welding torches. In particular, certain embodiments of the present invention may be in the form of relatively compact twin-welding torch arrangements. A plurality of welding torches on a single bug may be particularly advantageous in certain applications because, for example, the time taken to weld the pipes together may be reduced. In the case where the welding bug of the present invention comprises a plurality of welding torches, any, or all, of the plurality of torches may be arranged in accordance with any aspect of the present invention.

International Patent Application No. PCT/EP99/10505 (Publication No. WO00/38872) describes the use of two welding torches on a single bug and the contents of that application are hereby fully incorporated herein by reference. The plurality of welding torches may be arranged in accordance with any aspect of the welding apparatus described in PCT/EP99/10505. In particular, the claims of the present application may be amended to include the feature of the welding apparatus of PCT/EP99/10505, and the present invention may further be defined with reference to features of the method and/or apparatus described or claimed in the above-mentioned related patent application. For example: at least two torches of said plurality of arc welding torches may be arranged directly adjacent to each other so that, during the operation of the torches, the arcs of said at least two torches are produced directly one after the other in the groove; the arc produced by each of said plurality of arc welding torches may be independently automatically electronically guided by ascertaining electrical characteristics of the welding with regard to each pipe, respectively; and/or the welding bug may be so configured that it may be used to weld together two pipes laid end to end defining therebetween a groove, the walls defining the groove being separated by an angle of less than 10 degrees.

According to another aspect of the present invention, there is provided a welding bug comprising a welding torch that is moveable, during use of the welding bug when arranged to enable the torch to weld in a groove, between (i) an operating position in which the welding torch is positioned in the groove, and (ii) a disengaged position in which the welding torch is positioned away from the groove. The position of the torch as resolved in a direction along the width of the bug when in the disengaged position is substantially the same as when the torch is in the operating position. The separation of the torch from the groove when in the disengaged position preferably has both a component in the direction of the height of the bug and a component in the direction of the length of the bug.

According to another aspect of the present invention, there is provided a method of welding two pipes together comprising the steps of: arranging two pipes end to end, the pipes being so shaped that a circumferentially extending groove is defined between the ends of the pipes, providing a welding bug for welding in the groove, the welding bug comprising a welding torch, rotating the welding torch about an axis that is substantially horizontal relative to the welding bug, between an operating position in which the welding torch is positioned for welding in the groove, and a disengaged position in which the welding torch is positioned away from the groove.

The method may also comprise the step of moving the torch in a linear direction along the length of the bug, and preferably relative to the main body of the bug, between the operating position and the disengaged position.

During movement between the operating position and the disengaged position, the welding torch is advantageously rotated about the horizontal axis by less than 110 degrees. The welding bug may be rotated about the horizontal axis by more than 40 degrees during movement between the operating position and the disengaged position. During movement between the operating position and the disengaged position, the welding torch may be counter-rotated about two horizontal axes. The welding torch may be counter-rotated by substantially equal and opposite amounts, thereby maintaining substantially the same orientation in the operating and disengaged positions.

The welding bug is typically mounted on a pipe clamp during welding. The pipe clamp is typically arranged circumferentially around the pipe. The method of the present invention may include the step of mounting the bug on the pipe clamp, and may also include the step of moving the welding bug along the pipe clamp.

Welding along the groove is typically effected by moving the welding bug (for example along the pipe clamp) whilst the torch is in the operating position. The welding bug may be arranged to weld the entire length of the groove in one weld pass, but is preferably arranged to weld a discrete portion, or sector, of the groove in a weld pass.

Movement of the welding torch to the disengaged position is particularly beneficial after the welding bug has completed a weld pass. When the torch is in the disengaged position the welding bug may be able to move freely around the pipe (for example, to return to the start of the next weld pass) without risk of damaging the welding torch on the pipe, the groove, or through a collision with another welding bug, if such is provided. The method of the present invention may include the step of welding in the groove whilst moving the welding bug when the torch is in the operating position, thereby forming a weld about a circumferential portion of the groove. The method may also include the step of then moving the welding torch to the disengaged position.

An additional welding bug for welding in the groove may be provided, the additional welding bug comprising a welding torch. The additional welding bug may be arranged in accordance with any aspect of the present invention. The method may comprise the step of welding in the groove with the additional welding bug.

The method may comprise the step of moving the welding torch of the first welding bug to the disengaged position before, and possibly immediately before, the welding torch of the additional welding bug is in proximity to the first welding bug. The method may comprise the step of moving the welding torch of the first welding bug to the disengaged position whilst the welding torch of the additional welding bug is both in proximity to the first welding bug and is in the operating position. Arranging the welding bugs to be, at some stage in the welding process, in proximity to one other, may be effective in reducing down-time. For example, the welding bugs may be so arranged that the additional welding bug is nearing completion of its weld pass shortly after the first welding bug has completed a weld pass, those weld passes finishing at substantially the same position in the groove. The welding torch of the first welding bug may be moved to the disengaged position upon completion of its weld pass, to allow the additional welding bug to complete its weld pass.

The welding bugs may be considered as being in proximity when they are less than two, more preferably less than one, bug-width apart, and yet more preferably less than half a bug width apart. The welding bugs may be almost touching one another. The welding bugs may be considered as being in proximity when the angular spacing of their mid-points around the pipe is less than 40 degrees, more preferably less than 20 degrees and yet more preferably less than 10 degrees, although this may, of course, depend on the diameter of the pipe being welded.

As mentioned above, the method of the present invention may include the step of welding in the groove whilst moving the first welding bug when the welding torch is in the operating position, thereby forming a weld about a first circumferential portion of the groove. Movement of the additional welding bug around a portion of the pipe may be effected, whilst welding in the groove with the additional welding bug, thereby forming a weld around a second circumferential portion of the groove, wherein the second circumferential portion of the groove adjoins, at at least one end, the first circumferential portion of the groove, and wherein the movement of the additional welding bug to the junction between the first circumferential portion and the second circumferential portion of the groove, is effected after the welding torch of the first welding bug has moved to the disengaged position.

A multiplicity of additional welding bugs may be provided. The multiplicity of welding bugs may be arranged on the same pipe clamp. The multiplicity of welding bugs may be arranged on different pipe clamps arranged either side of the groove. At least two of the welding bugs may be arranged to weld specific circumferential portions, or sectors, of the groove. For example, four welding bugs may be provided, two welding bugs being arranged per pipe clamp. Alternatively eight welding bugs may be provided, four welding bugs being arranged per pipe clamp. Each welding bug may be arranged to weld a 90 degree portion of the groove. The start/stop position of the weld pass and/or the angular length of the weld pass may vary throughout the welding process. For example, the angular length of any one particular weld pass may be optimised for weld quality/time by a software unit.

The first welding bug may be arranged to weld from a first side of the groove. An additional welding bug may be arranged to weld from that first side of the groove. Alternatively an additional welding bug may be arranged to weld from the other side of the groove.

At least two of the welding bugs may be arranged to weld in opposite circumferential directions.

In some pipe welding arrangements, it may be necessary to use two slightly different types of welding bug. For example, for ergonomic reasons it may be necessary to use welding bugs with different control panel layouts and/or different wire feed arrangements depending on which circumferential direction the welding bugs are to weld. The bugs are typically named left-hand or right-hand bugs. Rotating the welding torches about an axis that is substantially horizontal relative to the welding bug (in accordance with the method of the present invention) may remove the need for these ergonomic differences and may enable a plurality of identical welding bugs to be used on the pipe. At least 75%, and more preferably all, of the welding bugs that are provided may be identical.

The pipes may be for a land-based pipeline, but are preferably for an underwater deep-sea pipeline.

At least part of the pipes may comprise a coating, for example a concrete coating.

As will be appreciated, features of one or more of the above described apparatuses and methods of the invention can be incorporated into other apparatuses and methods of the invention. By way of example, the welding bug in the method of the present invention may comprise a plurality of welding torches, wherein the method of welding comprises the step of rotating the plurality of welding torches about a substantially horizontal axis, relative to the welding bug, between an operating position in which the welding torches are positioned for welding in the groove, and a disengaged position in which the welding torches are positioned away from the groove.

DESCRIPTION OF THE DRAWINGS

Various embodiments of the invention will now be described, by way of example only, with reference to the accompanying schematic drawings of which.

DETAILED DESCRIPTION

It is known to use welding bugs in automated pipe welding arrangements, especially when laying oil or gas pipelines. In such arrangements, at least two welding bugs are typically mounted, on a pipe clamp, for circumferential movement around the pipe. So as to reduce the likelihood of a welding torch on the welding bugs interfering with parts of the pipe (such as the groove or the weld), it is known to move a welding torch to a disengaged position. In known arrangements, the welding torch tends to be rotated to one side about a vertical axis (i.e. an axis that is typically radial when the welding bug is mounted on a pipe).

These known arrangements have a number of disadvantages. In particular the welding bug, when the torch is in the disengaged position, tends to be relatively cumbersome on the pipe. The welding bug also takes up a relatively large amount of space around the circumference of the pipe. The welding bug may also be unduly complex, heavy, and/or difficult to maintain.

Figure 1A:
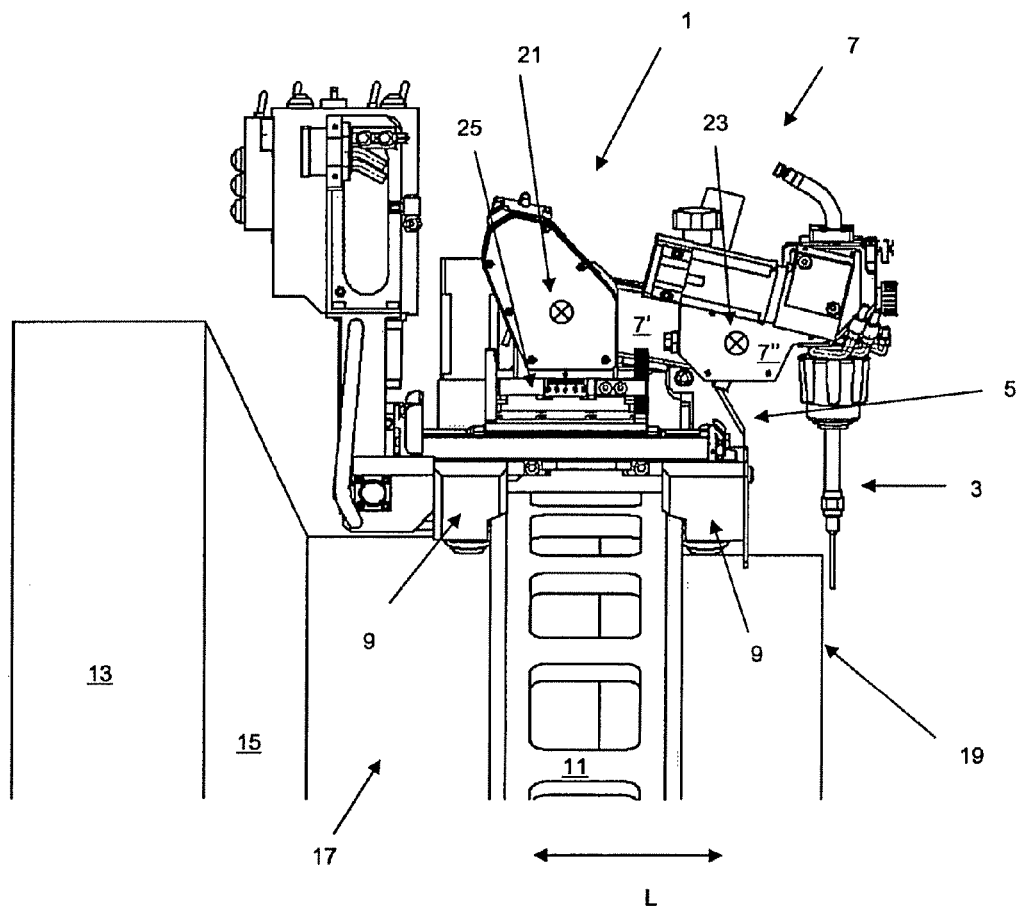
FIGS. 1a and 1b are side views of a welding bug according to a first embodiment of the invention.
Figure 1B:
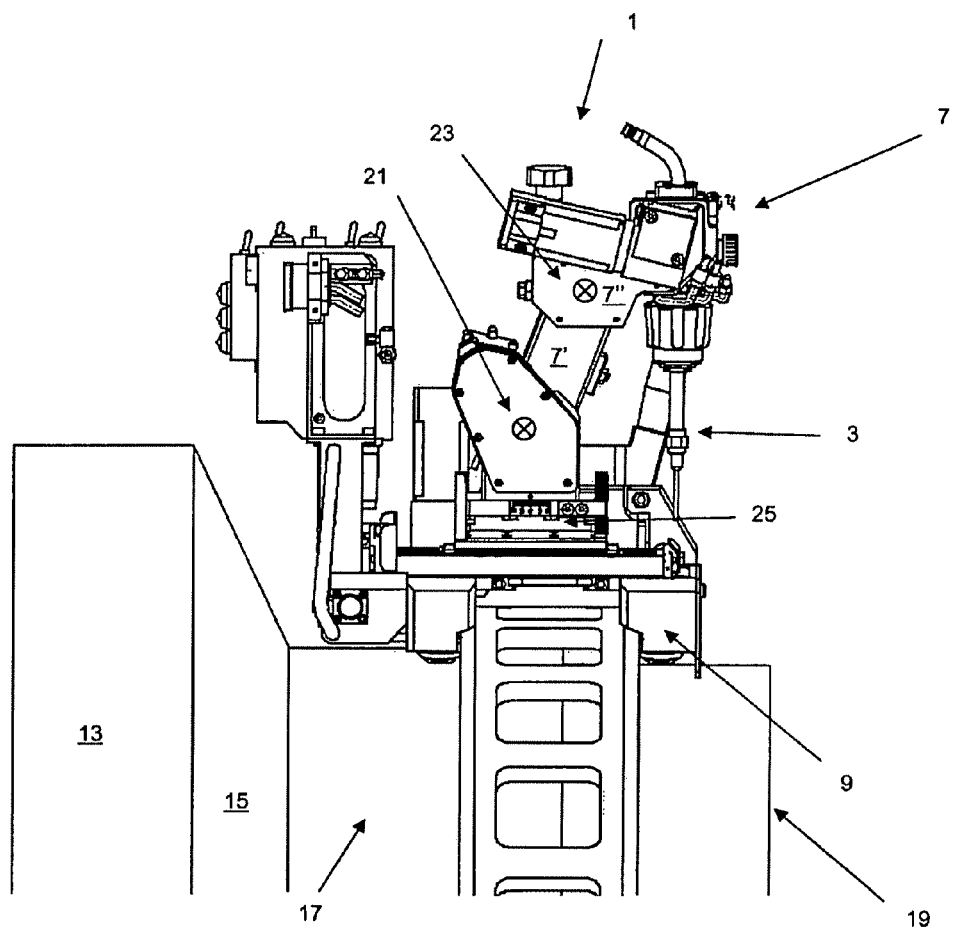

Referring to FIGS. 1a and 1b, a welding bug 1 according to a first embodiment of the present invention comprises a welding torch 3, a main body 5 and a robotic control arm 7 connected between the torch 3 and the main body 5. During use, the welding bug is mounted, on runners 9, to a pipe clamp 11 attached to a pipe 13.

The entire outer surface of the pipe has a concrete coating 15, except along the cut-back length 17 at the end of the pipe to be welded, the coating 15 has been removed to allow mounting of the pipe clamp 11. The pipe also has a relatively thin plastic coating (not shown) located radially between the steel pipe itself and the concrete coating. The plastic coating is also cutback from the end of the pipe to be welded. The pipe clamp 11 is located on the junction between the plastic coating and the steel pipe (the plastic coating being on the left-hand side of the clamp FIG. 1a, and the steel pipe being on the right-hand side of the clamp FIG. 1a).

Prior to welding, the pipe 13 is arranged end to end with a second pipe (not shown). The pipes are so shaped that a circumferentially extending groove 19 is defined between the ends of the pipes.

In the first embodiment of the invention, the welding torch 3 is mounted for rotational movement about two axes 21, 23 on the control arm 7. The axes are both horizontal, with respect to the welding bug 1, and are parallel to the width of the bug (the width of the bug being in a direction into the page in FIGS. 1a and 1b). As the welding bug is mounted on a pipe, the horizontal axes are parallel to the tangent to the pipe at the location being welded.

The first axis 21 (at the base of the control arm 7) is located approximately centrally on the bug main body. The second axis 23 (positioned at the junction between the base portion 7' of the control arm 7, and the outer portion 7" of the control arm 7) defines an elbow joint on the arm 7. The welding torch 3 is mounted for counter-rotational movement about the two axes.

The welding torch 3 is also mounted for linear movement in a direction along the length L of the bug. The first axis 21 is mounted on a slideway 25. The slideway itself is fixedly mounted on the main body 5 of the welding bug 1, but comprises a runner/slider arrangement to allow relative linear movement between the first axis 21 on the control arm 7 (and hence the welding torch 3) and the welding bug main body 5.

The welding torch 3 is moveable, about the horizontal axes 21, 23, and (to a lesser extent) on the slideway 25, between an operating position (shown in FIG. 1a) and a disengaged position (shown in FIG. 1b).

A control unit on the welding bug (not shown) facilitates guidance of the welding torch 3 between the two positions. In the operating position, the welding torch 3 is positioned in the groove 19. In the disengaged position, the torch is positioned away from the groove 19.

The welding bug is arranged such that in the disengaged position, the welding torch 3 is sufficiently far away from the groove 19 to largely remove the possibility of interference with the pipe. The welding bug, when the welding torch is in the disengaged position, also allows passage of the welding torch on a second welding bug along the groove (see below with reference to FIG. 2). By arranging the welding torch to be mounted for rotational movement about the horizontal axes, the welding bug tends to be (at least in the disengaged position) more compact and manoeuvrable on the pipe clamp than an arrangement in which the torch is rotatable about a vertical axis. The welding bug therefore occupies relatively little space on the pipe circumference when the welding torch is in the disengaged position.

During movement to the disengaged position the welding torch 3 is rotated by 100 degrees about the first horizontal axis 21 (the base portion 7' of the arm 7 moves from 110 degrees to the vertical (FIG. 1a) to 10 degrees to the vertical (FIG. 1b)). The torch is also counter-rotated by 110 degrees in the opposite direction about the second horizontal axis (the outer portion 7" of the arm 7 moves from −10 degrees to the base portion 7' (FIG. 1a), to +80 degrees to the base portion 7' (FIG. 1b)). The torch thereby maintains the same orientation (i.e. substantially vertical) in the operating and disengaged positions.

The first axis 21 is also moved, relative to the welding bug main body, a short (linear) distance along the slideway 25.

Although the welding bug is shown with the torch in the particular operating/disengaged positions in FIGS. 1a and 1b, the welding torch on the welding bug of the first embodiment of the invention, is operable between a deployed position in which the base portion 7' of the arm 7 is anywhere between 70 and 110 degrees to the vertical, and a disengaged position in which the base portion 7' is anywhere between 10 degrees and 70 degrees to the vertical.

In the disengaged position the torch is lifted out and away from the groove 19. Rotation about a horizontal axis enables movement of the torch (between the operating and the disengaged positions) to comprise a radial component (with respect to the pipe). The welding bug of the first embodiment therefore also provides improved control of the welding torch in the radial direction.

Figure 2:
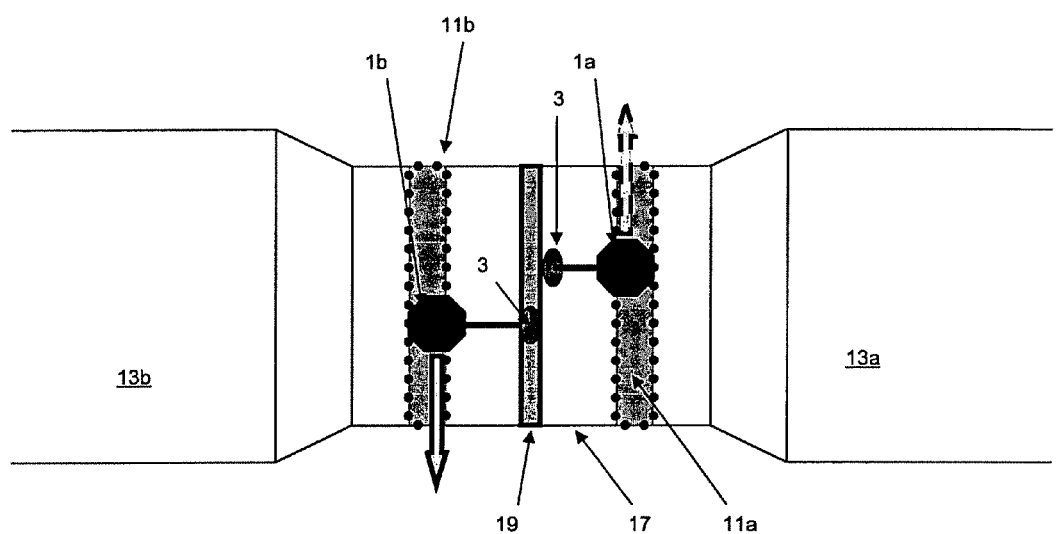
FIG. 2 is a schematic drawing of two pipes being welded together by bugs according to the first embodiment of the invention.

Referring to FIG. 2, two welding bugs 1a, 1b according to the first embodiment of the invention are used in a method of welding two pipes 13 together.

The two pipes 13a, 13b are arranged end to end and are so shaped that a circumferentially extending groove 19 is defined between the ends of the pipes 13a, 13b. Each pipe has a concrete coating 15, and a cut-back region 17 (the chamfer of the cutback is exaggerated in the Figures, and in practice extends in a substantially radial direction). In the cut-back region, one pipe clamp 11a is mounted on one side of the groove and another pipe clamp 11b is mounted on the other side of the groove 19. Both pipe clamps are located over the plastic coating/steel interface of their respective pipes.

A welding bug 1 according to the first embodiment is mounted on each of the pipe clamps. During use, the first welding bug 1a (shown on the right-hand pipe clamp in FIG. 2) is moved around a 180 degree sector of the pipe clamp 11a whilst the welding torch is in the operating position thereby forming a circumferential weld in a sector the groove. The welding bug tracks the location of the torch in the groove as the bug moves circumferentially around the pipe, thereby ensuring adequate weld quality. As is typical with welding torches, the torch does not point directly at the centre of the pipeline during welding (i.e. it is not exactly radial), but instead points a little away from it, forming an angle of 8 degrees with the radius (in the plane of the pipe joint).

The second welding bug 1b (shown on the left-hand pipe clamp 11b in FIG. 2) is moved around the opposite 180 degree sector of the pipe clamp (shown by the solid arrow in FIG. 2), thereby forming an additional circumferential weld over this sector of the pipe joint.

When the first welding bug 1a finishes a weld pass, the welding torch is rotated about the horizontal axes 21, 23 from the operating position to the disengaged position, and the bug returns to its starting position to begin the next weld pass (shown by the dashed arrow in FIG. 2).

Figure 3:
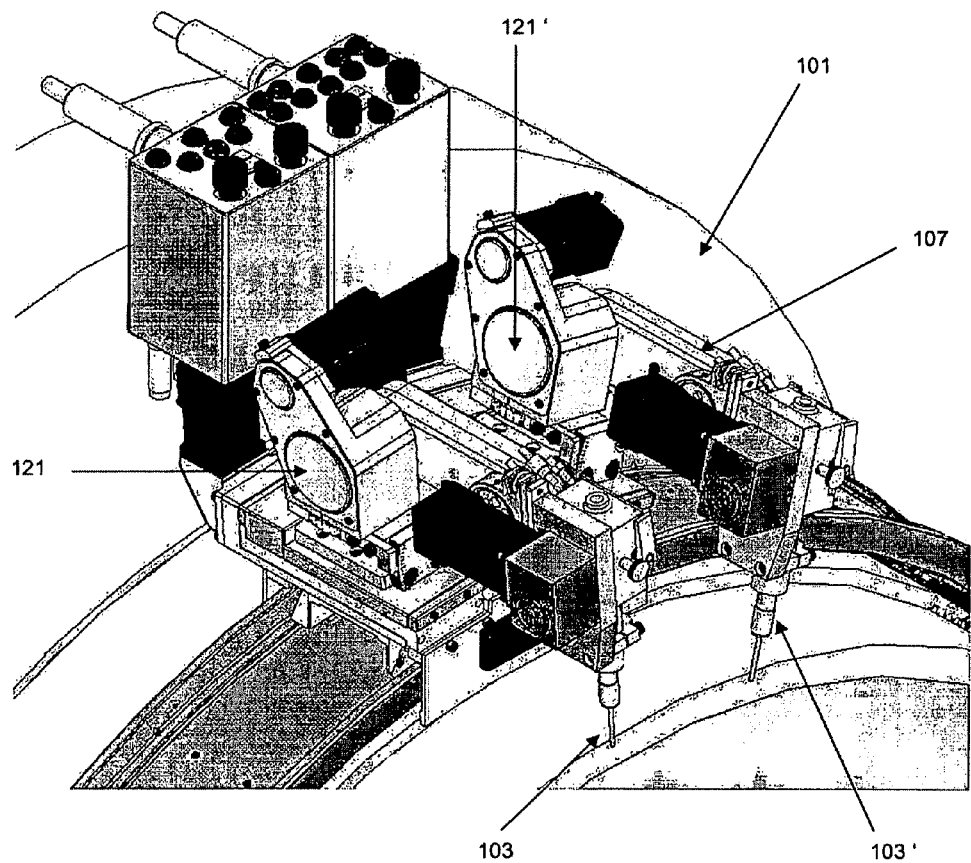
FIG. 3 is a perspective view of a welding bug according to a second embodiment of the invention.

FIG. 3 shows a welding bug 101 according to a second embodiment of the invention operating in a groove of less than 10 degrees. The welding bug 101 is substantially as described with reference to the first embodiment except for the features described below.

The welding bug 101 comprises two welding torches 103, 103'. Each welding torch is connected to a control arm 107 for rotational movement about a horizontal axis 121, 121' substantially parallel to the width of the bug. In the second embodiment of the invention, the bug is of sufficient width that the horizontal axis 121 of the first welding torch is not quite parallel to the horizontal axis 121' of the second welding torch (both horizontal axes being parallel to the tangent of the cross-section of the pipe at the location being welded).

The welding torches are arranged directly adjacent to each other so that, during the operation of the torches, the arcs of the two torches are produced directly one after the other in the groove. Such a feature is described in International Patent Publication No. WO00/38872.

The welding torches 103 do not rotate about a vertical axis to the disengaged position. This enables the welding bug to be more compact (especially with the torch in the disengaged position) and easier to maintain than some known welding bugs, particularly known twin-torch welding bugs.

By mounting the torches for movement about a horizontal axis between the operating position and the disengaged position, the welding torches also have a trajectory that interferes with fewer elements on the welding bug and/or pipe, than the trajectory of the welding torch on some known welding bugs.

Figure 4:
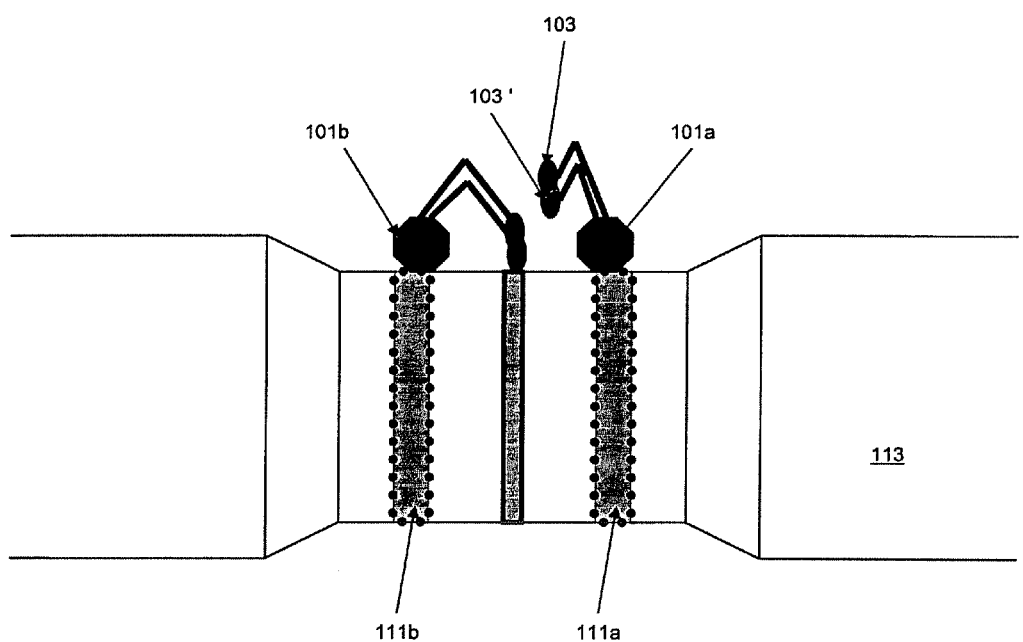
FIG. 4 is a schematic drawing of two pipes being welded together by bugs according to the second embodiment of the invention.

FIG. 4 is schematic drawing of two welding bugs 101a, 101b according to the second embodiment of the invention, mounted on two pipes 113. The method of using the welding bugs is substantially as described with reference to the first embodiment. During use, the first welding bug 101a (shown on the right-hand pipe clamp in FIG. 4) is moved around a sector of the pipe clamp 111a whilst the welding torches are in the operating position, thereby forming a circumferential weld in a sector the groove. The second welding bug 101b (shown on the left-hand pipe clamp in FIG. 4) is moved around another sector of the pipe clamp 111b, thereby forming another circumferential weld.

When the first welding bug 101a finishes a weld pass, the welding torches 103, 103' are rotated about the horizontal axis 121, 121' from the operating position to the disengaged position, and the bug returns to its starting position to begin the next weld pass.

Figure 5:
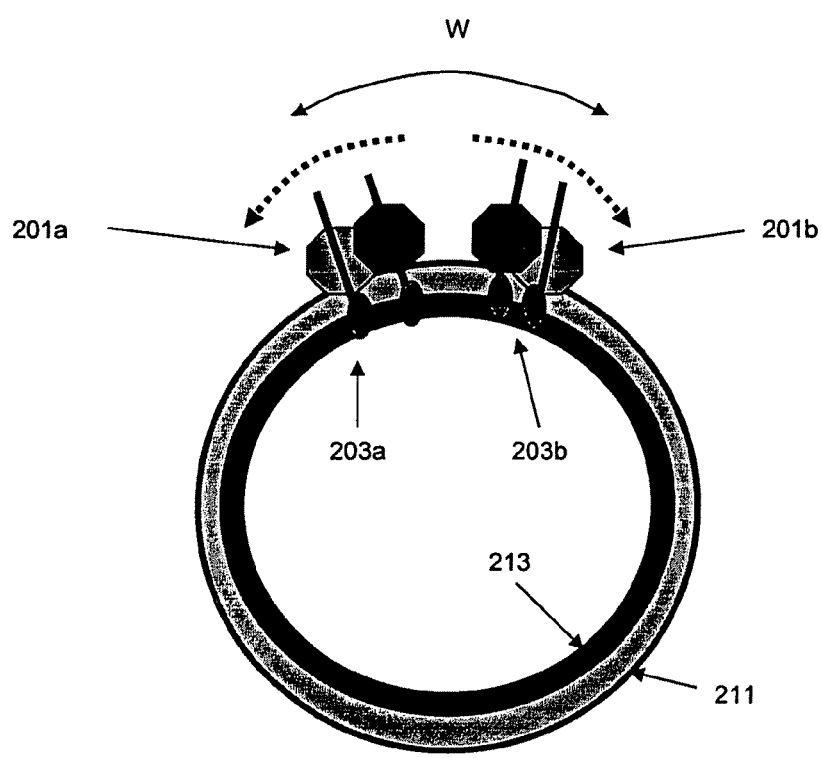
FIG. 5 shows an end-on view of a pipe and pipe clamp arrangement according to a third embodiment of the invention.

FIG. 5 shows an end-on view of a pipe and pipe clamp arrangement according to a third embodiment of the invention. A pipe-clamp 211 is mounted on each of the pipes to be welded (only one of which is shown). The pipe clamp 211 on that pipe 213 carries two welding bugs 201a, 201b, each bug being substantially as described with reference to the second embodiment of the invention. The welding bugs are mounted to travel in a circumferential direction W and therefore initially in a direction parallel to the width of the welding bug/ tangential to the pipe.

During use, the first welding bug 201a (on the left-hand side of FIG. 5) travels in an anti-clockwise direction around the pipe clamp 211, thereby forming a circumferential weld around a 90 degree sector of the pipe circumference. A short period afterwards, the second welding bug 201b (on the right-hand side of FIG. 5) travels in a clockwise direction around the opposite 90 degree circumferential portion of the weld.

The pipe clamp on the other pipe (not shown) supports a third and fourth welding bug. These bugs travel over the opposite (lower) 90 degree portions of the circumference in a similar manner to that described above.

After the first welding bug 201a completes its weld pass, it moves both welding torches 203a about the horizontal axes from the operating position to the disengaged position just before the third welding bug would have come into contact with them. This allows the third welding bug (not shown) to weld to a location adjoining the end of the first weld pass, without necessitating movement of the first welding bug (the torches in the disengaged position being sufficiently far away from the groove). The welding bugs are kept as close as possible to one another to reduce down-time.

The welding bugs shown in FIG. 5 are arranged to initially weld a 90 degree circumferential portion, or sector, of the groove as described above. However, the start/end positions of the welding bugs in the sectors are optimized for weld time/quality by software. Thus, the sectors are not necessarily over a 90 degree portion, throughout welding of the pipes.

According to a fourth embodiment of the invention (not shown), four welding bugs according to the present invention are mounted on a first pipe clamp on one side of the groove, and four welding bugs are mounted on a second pipe clamp on the other side of the groove (i.e. eight welding bugs in total). Each welding bug is arranged to weld a sector of the circumferential length of the groove. Each bug carries two torches.

Whilst the present invention has been described and illustrated with reference to particular embodiments, it will be appreciated by those of ordinary skill in the art that the invention lends itself to many different variations not specifically illustrated herein. For example each welding bug may comprise a welding torch arranged for rotational movement about only a single horizontal axis. The welding bug could be arranged such that when moving the torch between the operating and disengaged positions, the axis does not move in a linear direction along the length of the bug. Each welding bug may contain three or more torches.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A welding bug, comprising:
    a control arm and a welding torch arranged on the control arm, the welding torch being suitable for welding in a groove at a joint between an end of a first pipe and an end of an adjacent second pipe, and
    a pipe clamp for mounting to circumferentially extend around a longitudinal axis of the first pipe,
    wherein the welding bug is mounted on the pipe clamp for circumferential movement around the first pipe, and wherein the control arm is mounted on the welding bug for rotational movement about an axis that is substantially horizontal, relative to the welding bug, the axis being orientated perpendicular to the longitudinal axis of the pipes at the joint, and the axis being set back from the torch in the longitudinal direction, and wherein
    the welding bug is arranged such that the torch is moveable about said axis, during use of the welding bug when arranged to enable the torch to weld in a groove, between (i) an operating position in which the welding torch is positioned in the groove, and (ii) a disengaged position in which the welding torch is positioned out of the groove after the welding bug has completed a weld pass.

2. A welding bug according to claim 1, wherein the movement of the welding torch between the operating position and the disengaged position comprises a linear component.

3. A welding bug according to claim 2, wherein the welding bug comprises a main body, and the horizontal axis is mounted for linear movement relative to said main body.

4. A welding bug according to claim 1, wherein the welding torch is mounted for rotational movement about a plurality of axes that are substantially horizontal, relative to the welding bug, between the operating position and the disengaged position.

5. A welding bug according to claim 4, wherein the welding torch is mounted for counter-rotational movement about at least two of the horizontal axes.

6. A welding bug according to claim 1, wherein the control arm comprises an elbow joint.

7. A welding bug according to claim 1, comprising a plurality of welding torches, each torch being arranged on a respective control arm in accordance with the welding torch of claim 1.

8. A welding bug according to claim 7, wherein at least two torches of said plurality of welding torches are arranged directly adjacent to each other so that, during the operation of the torches, the arcs of said at least two torches are produced directly one after the other in the groove.

9. A welding bug for mounting on a pipe, the welding bug comprising a control arm and a welding torch arranged on the control arm, the welding torch being suitable for welding in a groove at a joint between an end of a first pipe and an end of an adjacent second pipe, and
    a pipe clamp for mounting to circumferentially extend around a longitudinal axis of the first pipe, wherein the welding bug is mounted on the pipe clamp for circumferential movement around the longitudinal axis of the first pipe, and
    wherein the control arm is mounted on the welding bug for rotational movement about an axis on the welding bug, the axis being substantially horizontal, relative to the welding bug, the axis being orientated perpendicular to the longitudinal axis of the pipe at a location at which the welding bug is to be mounted, and the axis being set back from the torch in the longitudinal direction, and wherein
    the torch is moveable about the axis, between (i) an operating position in which the torch is positioned in the groove, and (ii) a disengaged position in which the welding torch is positioned out of the groove to allow passage of a second welding torch along the groove in the vicinity of the welding bug.

10. A welding bug according to claim 1, wherein the welding torch is movable about said axis by more than 40 degrees between the operating position and the disengaged position.

11. A welding bug according to claim 9, where the welding torch is movable about said axis by more than 40 degrees between the operating position and the disengaged position.

* * * * *